(12) United States Patent
Han et al.

(10) Patent No.: US 11,974,239 B2
(45) Date of Patent: Apr. 30, 2024

(54) MEASUREMENT GAP CONFIGURATION METHOD AND DEVICE, STORAGE MEDIUM, AND ELECTRONIC DEVICE

(71) Applicant: ZTE CORPORATION, Guangdong (CN)

(72) Inventors: Jiren Han, Shenzhen (CN); Jing Liu, Shenzhen (CN); Yin Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/066,871

(22) Filed: Oct. 9, 2020

(65) Prior Publication Data

US 2021/0144658 A1 May 13, 2021

Related U.S. Application Data

(63) Continuation of application No. PCT/CN2019/081790, filed on Apr. 8, 2019.

(30) Foreign Application Priority Data

Apr. 13, 2018 (CN) .......................... 201810333257.7

(51) Int. Cl.
*H04W 24/10* (2009.01)
*H04W 28/086* (2023.01)
(Continued)

(52) U.S. Cl.
CPC ......... *H04W 56/001* (2013.01); *H04W 24/10* (2013.01); *H04W 28/0864* (2023.05);
(Continued)

(58) Field of Classification Search
CPC ......... H04B 7/02–0495; H04B 17/0082–3913; H04J 11/0023–0093;
(Continued)

(56) References Cited

U.S. PATENT DOCUMENTS

2012/0263054 A1* 10/2012 Kazmi .................. H04W 24/10
2017/0127397 A1 5/2017 Hahn et al.
(Continued)

FOREIGN PATENT DOCUMENTS

CN 103181215 A 6/2013
CN 107637120 A 1/2018
(Continued)

OTHER PUBLICATIONS

Ericsson: "Measurement configuration for EN-DC" 3GPP TSG RAN WG3 #99bis; R3-182255; Apr. 7-20, 2018; Sanya, P.R. China (6 pages). (Year: 2018).*
(Continued)

*Primary Examiner* — Timothy J Weidner
(74) *Attorney, Agent, or Firm* — Foley & Lardner LLP

(57) ABSTRACT

Provided are a measurement gap configuration method and device, a storage medium, and an electronic device. The method includes: determining, by a first network element, frequency information of a measurement target; and notifying, by the first network element, a second network element of the frequency information through first interface signaling; where the first network element and the second network element are configured on the same node. The problem in the related art of being unable to configure a measurement gap is solved.

10 Claims, 7 Drawing Sheets

(51) Int. Cl.

| | |
|---|---|
| *H04W 36/00* | (2009.01) |
| *H04W 56/00* | (2009.01) |
| *H04W 72/27* | (2023.01) |
| *H04W 76/15* | (2018.01) |
| *H04W 84/02* | (2009.01) |
| *H04W 88/02* | (2009.01) |
| *H04W 88/08* | (2009.01) |
| *H04W 88/12* | (2009.01) |
| *H04W 92/02* | (2009.01) |
| *H04W 92/10* | (2009.01) |
| *H04W 92/12* | (2009.01) |
| *H04W 92/20* | (2009.01) |

(52) U.S. Cl.
CPC ....... *H04W 36/0069* (2018.08); *H04W 72/27* (2023.01); *H04W 76/15* (2018.02); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(58) Field of Classification Search
CPC .. H04J 2011/0003–0096; H04L 5/0001–0098; H04W 8/18–245; H04W 24/02–10; H04W 28/02–26; H04W 36/0005–385; H04W 48/02–20; H04W 56/0005–0025; H04W 72/005–14; H04W 76/10–50; H04W 84/02–16; H04W 88/005–18; H04W 92/02; H04W 92/04; H04W 92/10; H04W 92/12; H04W 92/16; H04W 92/20; H04W 92/22
See application file for complete search history.

(56) References Cited

U.S. PATENT DOCUMENTS

| | | | | |
|---|---|---|---|---|
| 2019/0075585 | A1* | 3/2019 | Deogun | H04W 72/1257 |
| 2020/0128453 | A1* | 4/2020 | Teyeb | H04W 36/0069 |
| 2021/0059002 | A1* | 2/2021 | Fiorani | H04W 24/10 |

FOREIGN PATENT DOCUMENTS

| | | |
|---|---|---|
| CN | 107666727 A | 2/2018 |
| WO | WO-2008/114130 A2 | 9/2008 |
| WO | WO-2015/139270 A1 | 9/2015 |
| WO | WO-2018/033136 A1 | 2/2018 |
| WO | WO-2019/194729 A1 | 10/2019 |

OTHER PUBLICATIONS

Catt, "Stage 3 TP for L2 Measurements Support in Case of CU/DU Split", 3GPP TSG-RAN WG3 Meeting #96 R3-171463, May 19, 2017 (May 19, 2017) (8 pages).

International Search Report of the International Searching Authority on PCT/CN2019/081790, dated Jun. 27, 2019 (with English translation, 7 pages).

Samsung et al., "F1 Interface Setup and the Delivery of gNB-DU Capability", 3GPP TSG-RAN WG3 Meeting #96 R3-171703, May 19, 2017 (May 19, 2017) (4 pages).

3rd Generation Partnership Project: "Radio Resource Control (RRC) protocol specification (Release 15)" Technical Specification Group Access Network; NR; 3GPP TS 38.331 V15.1.0; Mar. 2018; Valbonne, France (268 pages).

Extended European Search Report for EP Appl. No. 19785310.4, dated Sep. 15, 2021 (15 pages).

Nokia et al.: "ASN.1 correction to Measurement gap assisiting information in inter-Node message" 3GPP TSG-RAN WG2 Meeting #101bis; R2-1805853; Apr. 20, 2018; Sanya, China (7 pages).

OPPO: "Clarification on Measurement Gap Configuration Procedure" 3GPP TSG-RAN2 Meeting #10bis; R2-1804356; Apr. 20, 2018; Sanya, P.R. China (3 pages).

Samsung: "Draft CR on Measurement Gap Assistance Information" 3PP TSG-RAN WG2 #101bis; R2-1804706; Apr. 20, 2018; Sanya, China (6 pages).

Ericsson: "Measurement configuration for EN-DC" 3GPP TSG RAN WG3 #99bis; R3-182255; Apr. 20, 2018; Sanya, P.R. China (6 pages).

First Office Action for JP Appl. No. 2020-555395, dated Dec. 24, 2021 (with English translation, 5 pages).

Huawei: "TP for NSA BL CR on measurement gap configuration" 3GPP TSG-RAN WG3 NR#99; R3-181118; Mar. 2, 2018; Athens, Greece (6 pages).

First Office Action for JP Appl. No. 2020-555395, dated Jun. 27, 2022 (with English translation, 9 pages).

Nokia et al., "Summary of Offline discussion #40" 3GPP TSG-RAN WG2 NR Ad hoc 1801, R2-1801657, Jan. 22, 2018, Vancouver, Canada (6 pages).

Ericsson, NTT Docomo, Inc., "Change Request on Corrections to PxxCH configurations," 3GPP TSG-RAN WG2 Meeting #101bis, R2-1806200, Apr. 16-20, 2018, Sanya, China (271 pages).

Huawei: "Overview of UMTS Heterogeneous Networks," 3GPP TSG-RAN WG3 Meeting #81, R3-131284, Aug. 19-23, 2013, Barcelona, Spain (5 pages).

Third Office Action for CN Appl. No. 202110209181.9 dated Mar. 29, 2023 (with English translation, 8 pages).

Communication pursuant to Article 94(3) for EP Appl. No. 19785310.4 dated Mar. 20, 2023 (9 pages).

Ericsson: "Measurement configuration for SA" 3GPP TSG RAN WG3 #99bis; Tdoc R3-182207; Apr. 20, 2018; Sanya, P.R. China (5 pages).

\* cited by examiner

MEASUREMENT GAP CONFIGURATION METHOD AND DEVICE, STORAGE MEDIUM, AND ELECTRONIC DEVICE

CROSS-REFERENCE TO RELATED APPLICATIONS

This application claims the benefit of priority under 35 U.S.C. § 120 as a continuation of PCT Patent Application No. PCT/CN2019/081790, filed on Apr. 8, 2019, which claims priority to Chinese patent application no. 201810333257.7, filed on Apr. 13, 2018, the disclosure of each of which is incorporated herein by reference in its entirety.

TECHNICAL FIELD

The present disclosure relates to the field of communications and, specifically, to a measurement gap configuration method and device, a storage medium, and an electronic device.

BACKGROUND

In the related art, the 5th generation wireless systems (5G) network architecture shows innovation and networking flexibility, and in the 5G network, a base station on a wireless access network side is separated into two functional entities, i.e., a centralized unit (CU) and a distributed unit (DU). Controlling multiple distributed units through the centralized unit may implement the baseband centralized processing of cloud architecture and provide services in a distributed manner for the far-end of users. In the CU-DU separated network architecture, a delay-insensitive network function is configured in the centralized unit (CU), and a delay-sensitive network function is placed in the distributed unit (DU), such that, on the one hand, a lot of core network signaling overheads are saved, and on the other hand, the switching delay is reduced and mobile performance of the new radio (NR) system can be enhanced. Transmission and connection between the CU and the DU are performed through an F1 interface.

Base stations in the long term evolution (LTE) system are reserved in the 5G network such that the cross-system dual-connectivity network architecture is formed. Such networking mode can improve the utilization rate of wireless resources, reduce the system switching time delay and improve the user and system performance. The dual connection mode in the 5G network includes the following modes.

A base station of a master node is an evolved NodeB (eNB), a base station of a secondary node is a next generation NodeB (gNB), and both the base stations are connected to the LTE core network, evolved packet core (EPC), i.e., evolved universal terrestrial radio access network (E-UTRAN), NR dual connectivity (EN-DC).

The base station of the master node is an eNB, the base station of the secondary node is a gNB, and both the base stations are connected to the NR core network, 5G core (5GC), i.e., next generation radio access network (NG-RAN) E-UTRA, NR dual connectivity (NGEN-DC).

The base station of the master node is a gNB, the base station of the secondary node is an eNB, and both the base stations are connected to the NR core network 5GC, i.e., NR, E-UTRAN dual connectivity (NE-DC).

The base stations of the master node and the secondary node are gNBs, i.e., NR, NR dual connectivity (NN-DC).

In the LTE system in the related art, if a user equipment (UE) has only one receiver, the UE can receive signals at only one frequency at the same moment. Before the inter-frequency inter-system handover, an inter-frequency inter-system measurement needs to be performed first. When an inter-frequency or inter-system measurement is triggered, an eNodeB will deliver a measurement gap related configuration, and the UE starts the measurement gap according to the configuration indication of the eNodeB.

However, in the 5G, under a multi-connection scenario including the CU-DU networking architecture, the related coordination process and detailed configuration process related to the measurement gap are yet not determined, such as the decision of related parameters of the gap pattern, the interaction process related to the gap configuration between the master node and the secondary node, and the interaction process related to the gap configuration between the first network element (gNB-CU) and the second network element (gNB-DU). Therefore, reasonable measurement gaps cannot be efficiently configured between network elements.

In view of the preceding problem in the related art, no effective scheme has yet been proposed.

SUMMARY

Embodiments of the present disclosure provide a measurement gap configuration method and device, a storage medium, and an electronic device.

According to an embodiment of the present disclosure, a measurement gap configuration method is provided. The method includes steps described below, a first network element determines frequency information of a measurement target, and the first network element notifies a second network element of the frequency information through first interface signaling, where the first network element and the second network element are configured on a same node.

According to an embodiment of the present disclosure, a measurement gap configuration method is provided. The method includes steps described below, a first network element calculates one or more sets of measurement gap pattern configuration information according to physical resource configuration information on one or more second network elements, and the first network element sends the one or more sets of gap pattern configuration information to a corresponding second network element, where the first network element corresponds to the one or more second network elements, and the first network element and the one or more second network elements are configured on a same node.

According to an embodiment of the present disclosure, a measurement gap configuration method is provided. The method includes steps described below, a second network element configures a gap pattern, and the second network element notifies a first network element of the gap pattern, where the first network element corresponds to one or more second network elements, and the first network element and multiple second network elements are configured on a same node.

According to an embodiment of the present disclosure, a measurement gap configuration method is provided. The method includes steps described below, a user equipment (UE) receives an air interface reconfiguration message, and when the air interface reconfiguration information causes a change in a gap requirement of the UE, and the UE responds a radio resource control (RRC) reconfiguration complete message, the UE notifies, in an information element of an RRC message of a master node, a network side of the change in the gap requirement, where the UE is connected to the master node and a secondary node simultaneously, the master node is an eNB or a gNB, and the secondary node is a gNB or an eNB.

According to an embodiment of the present disclosure, a measurement gap configuration method is provided. The method includes step described below, a secondary node requests a master node to perform one of gap configuration update or gap release by carrying an indication in a second interface message, or the secondary node receives a second interface message sent by a master node, where the second interface message carries an indication for notifying a secondary node side to perform one of gap configuration update, maintenance or release; and a UE is connected to the master node and the secondary node simultaneously.

According to an embodiment of the present disclosure, a measurement gap configuration method is provided. The method includes steps described below, a master node acquires indication information about measurement frequency configuration of a secondary node, and the master node determines an optional set of gap patterns through the indication information about the measurement frequency configuration, where a UE is connected to the master node and the secondary node simultaneously.

According to an embodiment of the present disclosure, a measurement gap configuration method is provided. The method includes step described below, in a scenario of 4/5G dual connection, a master node interacts with a secondary node about a measurement gap capability of a base station side through a third or second interface; or, in a scenario of NN-DC, a master node interacts with a secondary node about a measurement gap configuration capability of a base station side through a second interface.

According to another embodiment of the present disclosure, a measurement gap configuration device is provided. The device is applied to a base station and includes a first network element and a second network element, the first network element determines frequency information of a measurement target, and the first network element notifies the second network element of the frequency information through first interface signaling.

According to another embodiment of the present disclosure, a measurement gap configuration device is provided. The device is applied to a base station and includes a first network element and one or more second network elements, the first network element calculates one or more sets of gap pattern configuration information according to physical resource configuration information on the one or more second network elements, and the first network element sends the one or more sets of gap pattern configuration information to a corresponding second network element, where the first network element corresponds to the one or more second network elements.

According to another embodiment of the present disclosure, a measurement gap configuration device is provided. The device is applied to a base station and includes a first network element and one or more second network elements, the one or more second network elements configure a gap pattern, and the one or more second network elements notify the first network element of the gap pattern.

According to another embodiment of the present disclosure, a measurement gap configuration device is provided. The device is applied to a user equipment (UE) and includes a receiving module and a notification module, the receiving module is configured to receive an air interface reconfiguration message, the notification module is configured to, when the air interface reconfiguration information causes a change in a gap requirement of the UE, and the UE responds an RRC reconfiguration complete message, notify, through an information element of an RRC message of a master node, a network side of the change in the gap requirement, where the UE is connected to the master node and a secondary node simultaneously, the master node is an eNB or a gNB, and the secondary node is a gNB or an eNB.

According to another embodiment of the present disclosure, a measurement gap configuration device is provided. The device is applied to a secondary node and includes a requesting module, which is configured to request a master node to perform one of gap configuration update or gap release by carrying an indication in a second interface message, or receive, by the secondary node, a second interface message sent by a master node, where the second interface message carries an indication for notifying a secondary node side to perform one of gap configuration update, maintenance or release; and a UE is connected to the master node and the secondary node simultaneously.

According to another embodiment of the present disclosure, a measurement gap configuration device is provided. The device is applied to a master node and includes an acquisition module and a determination module, the acquisition module is configured to acquire indication information of a secondary node, and the determination module is configured to determine an optional set of gap patterns through the indication information, where a UE is connected to the master node and the secondary node simultaneously.

According to another embodiment of the present disclosure, a measurement gap configuration device is provided. The device is applied to a master node and includes a first interaction module, or a second interaction module; the first interaction module is configured to, in a scenario of evolved universal terrestrial radio access network new radio dual connectivity (EN-DC), interact with a secondary node about a gap configuration capability of a base station side through a third interface; and the second interaction module is configured to, in a scenario of new radio new radio dual connectivity (NN-DC), interact with the secondary node about the gap configuration capability of the base station side through a second interface.

According to still another embodiment of the present disclosure, a storage medium is further provided. The storage medium stores a computer program, the computer program, when executed, is configured to implement steps in any one of the preceding method embodiments.

According to still another embodiment of the present disclosure, an electronic device is further provided. The electronic device includes a memory and a processor. The memory stores a computer program, and the processor is configured to execute the computer program to perform steps in any one of the preceding method embodiments.

Through the present disclosure, the related configuration parameters and configuration process of the measurement gap in the CU-DU networking architecture are specified. The problem in the related art of being unable to configure the measurement gap can be solved.

BRIEF DESCRIPTION OF DRAWINGS

The drawings described herein are used to provide a further understanding of the present disclosure and form a part of the present application. The illustrative embodiments and the description thereof in the present disclosure are used to explain the present disclosure and not to limit the present disclosure in an improper manner. In the drawings.

DETAILED DESCRIPTION

The present disclosure will be hereinafter described in detail with reference to drawings in conjunction with the embodiments. It is to be noted that if not in collision, the embodiments described herein and the features in the embodiments may be combined with each other.

It is to be noted that the terms "first", "second" and the like in the description, claims and above drawings of the present disclosure are used to distinguish similar objects and are not necessarily used to describe a particular order or sequence.

Figure 1:
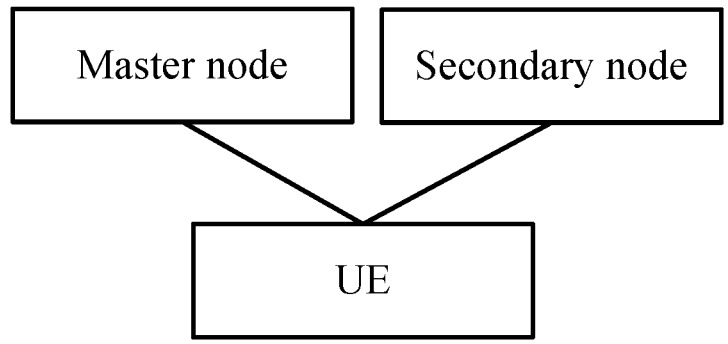
FIG. 1 is a network architecture diagram according to an embodiment of the present disclosure.

The embodiments of the present application may be run on the network architecture shown in FIG. 1. FIG. 1 is a network architecture diagram according to an embodiment of the present disclosure. The network architecture includes a master node, a secondary node and a UE. The master node and the secondary node may be understood as base stations on a network side (i.e., a master base station and a secondary base station respectively). The base station includes a first network element DU and a second network element CU. Both the DU and CU adopt the separated architecture. In this embodiment, a first interface is illustrated as an F1 interface, a second interface is illustrated as an Xn interface and a third interface is illustrated as an X2 interface.

Embodiment One

Figure 2:
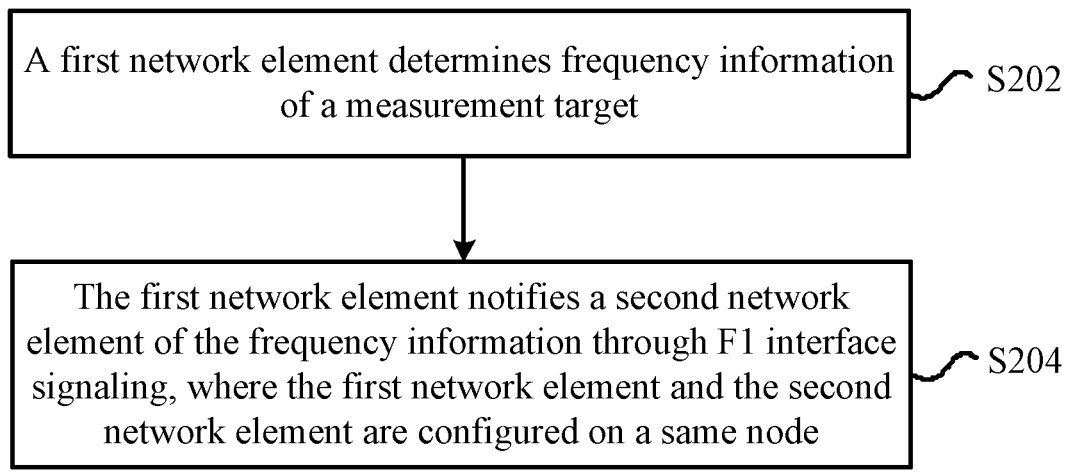
FIG. 2 is a flowchart of a measurement gap configuration method according to an embodiment of the present disclosure.

In this embodiment, a measurement gap configuration method executed on the above network architecture is provided. FIG. 2 is a flowchart of a measurement gap configuration method according to an embodiment of the present disclosure. As shown in FIG. 2, the method includes steps described below.

In step S202, a first network element determines frequency information of a measurement target.

In step S204, the first network element notifies a second network element of the frequency information through F1 interface signaling.

The first network element and the second network element are configured on a same node.

Through the above steps, the related configuration parameters and configuration process of the measurement gap in the CU-DU networking architecture are specified, and the problem in the related art of being unable to configure the measurement gap can be solved.

In an embodiment, the F1 interface signaling includes at least one of: a UE context setup request, or a UE context modification request.

In an embodiment, the frequency information includes at least one of: a measurement frequency list set, synchronization signal block (SSB) measurement timing configuration (SMTC) information of each measurement frequency, channel state information reference signal (CSI-RS) related time domain configuration information of each measurement frequency, an indication for indicating whether each measurement frequency initiates an SSB measurement, or an indication for indicating whether each measurement frequency initiates a CSI-RS measurement.

In an embodiment, after the first network element notifies the second network element of the frequency information through the F1 interface signaling, the method further includes a following step: when the frequency information does not carry the SMTC configuration or CSI-RS configuration corresponding to the measurement frequency, the second network element acquires the SMTC information of each measurement frequency and the CSI-RS time domain configuration information of each measurement frequency from a network management system.

Embodiment Two

In this embodiment, a measurement gap configuration method executed on the above network architecture is provided. Another measurement gap configuration method is provided in the embodiments, and the method includes steps described below.

In S11, the first network element calculates one or more sets of measurement gap pattern configuration information according to physical resource configuration information on one or more second network elements.

In S12, the first network element sends the one or more sets of measurement gap pattern configuration information to a corresponding second network element.

The first network element corresponds to one or more second network elements, and the first network element and the one or more second network elements are configured on a same node.

In an embodiment, before the step S11, the method further includes a following step: the first network element acquires the physical resource configuration information in one of following manners: the first network element acquires the physical resource configuration information in a manner of sending a request message to the second network element, or the second network element sends the physical resource configuration information to the first network element in a manner of active reporting.

In an embodiment, the physical resource configuration information includes, but is not limited to, at least one of: a scheduling request (SR), a sounding reference signal (SRS), or discontinuous reception (DRX).

In an embodiment, the measurement gap pattern configuration information includes, but is not limited to, at least one of: a measurement gap period, a measurement gap duration, a measurement gap offset, or a measurement gap type.

In an embodiment, the step in which the first network element sends the one or more sets of measurement gap pattern configuration information to the corresponding second network element includes one of following steps: the first network element sends the one or more sets of gap pattern configuration information simultaneously to all of the one or more second network elements; or, the first network element delivers the one or more sets of gap pattern configuration information independently according to an actual frequency configuration of a serving cell on each of the one or more second network elements.

In an embodiment, when there are multiple first network elements, a first network element of a master node sends the one or more sets of measurement gap pattern configuration information to a first network element of a secondary node; or, the first network element of the secondary node delivers the gap pattern configuration information independently according to an actual frequency configuration of a serving cell on a second network element of the secondary node.

Embodiment Three

In this embodiment, a measurement gap configuration method executed on the above network architecture is provided. Another measurement gap configuration method is provided in this embodiment, and the method includes steps described below.

In S21, a second network element configures a measurement gap pattern.

In S22, the second network element notifies a first network element of the measurement gap pattern.

The first network element corresponds to the one or more second network elements, and the first network element and multiple second network elements are configured on a same node.

In an embodiment, after the second network element notifies the first network element of the gap pattern, the method further includes a following step: when the first network element adds a new second network element, the first network element sends a gap pattern configuration, which has been in the first network element, to the new second network element through an F1 interface setup message.

In an embodiment, after the first network element sends the configured measurement gap pattern configuration to the new second network element through the F1 interface setup message, the method further includes a following step: the new second network element feeds back description information for representing whether the measurement gap pattern configuration is appropriate to the first network element.

When the measurement gap pattern configuration is not appropriate, the first network element re-performs a gap pattern configuration calculation; or, the original second network element re-configures a gap pattern.

In an embodiment, the measurement gap pattern includes at least one of: a measurement gap period, a measurement gap duration, a measurement gap offset, or a measurement gap type.

Embodiment Four

In this embodiment, a measurement gap configuration method executed on the above network architecture is provided. Another measurement gap configuration method is provided in this embodiment, and the method includes steps described below.

In S31, a user equipment (UE) receives an air interface reconfiguration message.

In S32, when the air interface reconfiguration information causes a change in a measurement gap requirement of the UE, and the UE responds an RRC reconfiguration complete message, the UE notifies, in an information element of an RRC message of a master node, a network side of the change in the measurement gap requirement. The UE is connected to the master node and a secondary node simultaneously, and may dually connect to the architecture in the NR system or dually connected to the architecture between 4/5G systems. The master node is an eNB or a gNB, and the secondary node is a gNB or an eNB.

In an embodiment, the air interface reconfiguration message is generated by the secondary node, and the air interface reconfiguration message is delivered to the UE through an RRC message of the master node in an encapsulation manner.

In an embodiment, the RRC reconfiguration complete message is sent from the UE to the master node, and the RRC reconfiguration complete message is carried in an encapsulation manner.

In an embodiment, the information element of the RRC message includes one of following forms: indicating whether a measurement gap needs to be configured, indicating respectively whether a serving cell with a frequency range (FR) 1 needs a measurement gap and whether a serving cell with an FR2 needs a gap; or indicating, for a configuration of a current serving cell, whether each frequency needs a measurement gap.

In an embodiment, the RRC message further carries a measurement gap pattern type desired by the UE.

In an embodiment, after the UE in the information element of the radio resource control (RRC) response message on an outer layer notifies the network side, the method further includes a following step: the UE receives a new gap configuration sent by the network side, and the gap configuration is obtained by the network side configuring a gap according to the information element of the received RRC message.

Embodiment Five

In this embodiment, a measurement gap configuration method executed on the above network architecture is provided. Another measurement gap configuration method is provided in this embodiment, and the method includes the steps described below.

In S14, a secondary node requests a master node to perform one of measurement gap configuration update or measurement gap release by carrying an indication in an X2 or Xn interface message; and meanwhile the secondary node receives an X2 or Xn interface message sent by the master node, where the X2 or Xn interface message carries an indication for notifying a secondary node side to perform one of measurement gap configuration update, maintenance or release, and the UE is connected to the master node and the secondary node simultaneously.

In an embodiment, the indication includes at least one of: indicating through an explicit information element in the Xn message, or indicating through an explicit information element in an RRC inter-node message carried in the X2 or Xn message.

Embodiment Six

In this embodiment, a measurement gap configuration method executed on the above network architecture is provided. Another measurement gap configuration method is provided in this embodiment, and the method includes steps described below.

In S51, a master node acquires indication information of a secondary node.

In S52, the master node determines an optional set of measurement gap patterns through the indication information.

A UE is connected to the master node and the secondary node simultaneously.

In an embodiment, a content of the indication information includes at least one of: whether the secondary node is configured with long term evolution (LTE) inter-frequency measurement; or, whether the secondary node deletes the LTE inter-frequency measurement.

In an embodiment, an indication manner of the indication information includes at least one of: transferring an LTE measurement frequency list configured by the secondary node through an Xn interface message, or indicating whether the secondary node is configured with the LTE inter-frequency measurement through an information element in the Xn interface message.

In an embodiment, the LTE measurement frequency list includes one of: a newly added or modified frequency list, or a deleted frequency list.

Embodiment Seven

In this embodiment, a measurement gap configuration method executed on the above network architecture is provided. Another measurement gap configuration method is provided in this embodiment, and the method includes steps described below.

In S61, in a scenario of evolved universal terrestrial radio access network new radio dual connectivity (EN-DC), a master node interacts with a secondary node about a measurement gap configuration capability of a base station side through an X2 interface, or in a scenario of new radio new radio dual connectivity (NN-DC), the master node interacts with the secondary node about the measurement gap configuration capability of the base station side through an Xn interface.

In an embodiment, the gap configuration capability includes whether the base station side supports a per-FR gap (herein FR is the frequency range).

In an embodiment, a transmission manner of the measurement gap configuration capability includes at least one of: transferring through cell-dedicated common signaling of the X2 interface or the Xn interface, or, transferring through UE-dedicated specific signaling of the X2 interface or the Xn interface.

From the description of the above-mentioned implementations, it will be apparent to those skilled in the art that the methods in the embodiments may be implemented by software plus a necessary general-purpose hardware platform, or may, of course, be implemented by hardware. However, in many cases, the former is an alternatively implementation. Based on this understanding, the schemes provided by the present disclosure substantially, or the part contributing to the related art, may be embodied in the form of a software product. The computer software product is stored in a storage medium (such as a read-only memory (ROM)/ random access memory (RAM), a magnetic disk or an optical disk) and includes several instructions for enabling a terminal device (which may be a mobile phone, a computer, a server, a network device, or the like) to execute the methods according to each embodiment of the present disclosure.

Embodiment Eight

In this embodiment, a measurement gap configuration device is further provided. The device is configured to implement the above-mentioned embodiments and alternative implementation manners. What has been described will not be repeated. As used below, the term "module" may be software, hardware or a combination thereof, which is capable of implementing predetermined functions. The apparatuses in the embodiments described below are alternative implemented by software, but implementation by hardware or by a combination of software and hardware is also possible and conceived.

Figure 3:
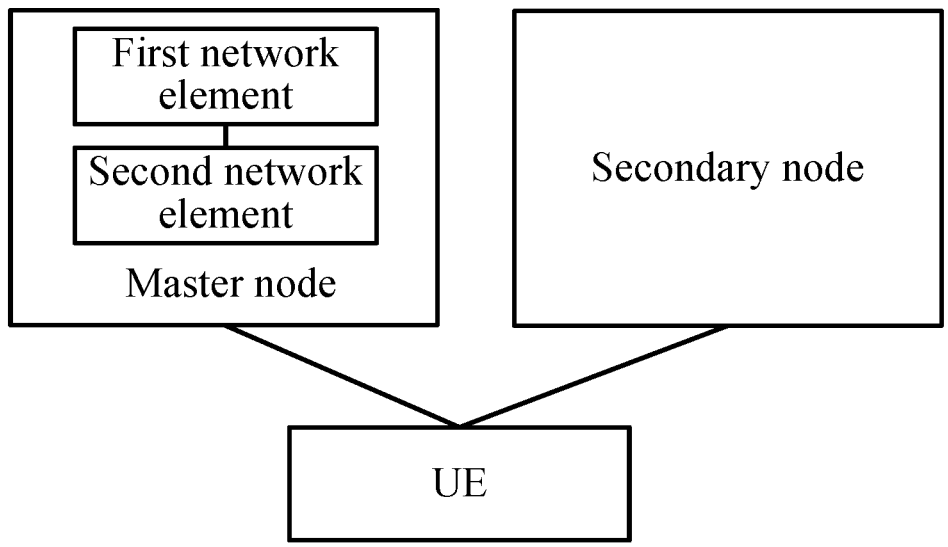
FIG. 3 is a block diagram of a measurement gap configuration device according to an embodiment of the present disclosure.

FIG. 3 is a block diagram of a measurement gap configuration device according to this embodiment of the present disclosure. The device is applied in a base station, and as shown in FIG. 3, the device is applied to a master node side, but the device may also be applied on a secondary node side. The device includes a first network element and a second network element. The first network element determines frequency information of a measurement target, and the first network element notifies the second network element of the frequency information through F1 interface signaling.

This embodiment further provides another measurement gap configuration device. The device is applied to a base station and includes a first network element and one or more second network elements. The first network element calculates one or more set of measurement gap pattern configuration information according to physical resource configuration information on the one or more second network elements, and the first network element sends the one or more sets of measurement gap pattern configuration information to a corresponding second network element, where the first network element corresponds to the one or more second network elements.

This embodiment further provides another measurement gap configuration device. The device is applied to a base station and includes a first network element and one or more second network elements. The one or more second network elements configure a gap pattern, and the one or more second network elements notify the first network element of the gap pattern.

This embodiment further provides another measurement gap configuration device. The device is applied to a user equipment (UE) and includes a receiving module and a notification module, the receiving module is configured to receive an air interface reconfiguration message, and the notification module is configured to, when the air interface reconfiguration information causes a change in a gap requirement of the UE, and the UE responds an RRC reconfiguration complete message, notify a network side of the change in the gap requirement through an information element of an RRC message of a master node; where the UE is connected to the master node and a secondary node simultaneously, the master node is an eNB or a gNB, and the secondary node is a gNB or an eNB.

This embodiment further provides another measurement gap configuration device. The device is applied to a secondary node and includes a requesting module, which is configured to request a master node to perform one of gap configuration update or gap release by carrying an indication in an Xn interface message, or receive, by the secondary node, an Xn interface message sent by the master node, where the Xn interface message carries an indication for notifying a secondary node side to perform one of gap configuration update, maintenance or release; where a UE is connected to the master node and the secondary node simultaneously.

This embodiment further provides another measurement gap configuration device. The device is applied to a master node and includes an acquisition module and a determination module, the acquisition module is configured to acquire indication information of a secondary node, and the determination module is configured to determine an optional set of gap patterns through the indication information; where a UE is connected to the master node and the secondary node simultaneously.

This embodiment further provides another measurement gap configuration device. The device is applied to a master node and includes a first interaction module or a second interaction module, the first interaction module is configured to, in a scenario of evolved universal terrestrial radio access network new radio dual connectivity (EN-DC), interact with a secondary node about a gap configuration capability of a base station side through an X2 interface, and the second interaction module is configured to, in a scenario of new radio new radio dual connectivity (NN-DC), interact with a secondary node about a gap configuration capability of a base station side through an Xn interface.

It is to be noted that the preceding modules may be implemented by software or hardware. Implementations by hardware may, but not necessarily, be performed in the following manner: the preceding modules are located in a same processor or the preceding modules are located in any combination in their respective processors.

Embodiment Nine

This embodiment provides related the configuration parameters and configuration process of the measurement gap under a multi-connection scenario of the CU-DU networking architecture of 5G.

The present embodiment also includes multiple examples to illustrate the measurement gap configuration process under different scenarios.

EXAMPLE ONE

In the EN-DC scenario, only an FR2 gap in the per-FR gap (herein, the per-FR gap corresponds to two different forms, i.e., an FR1 gap and the FR2 gap, which correspond to different frequency ranges: the frequency of the FR1 is relatively low while the frequency of the FR2 is relatively high) needs to be configured by the secondary node (SN) (e.g. NR) side. According to the current gap coordination framework, there are two kinds of triggering scenarios for the FR2 gap configuration on the SN side:

the measurement of the FR2 frequency needs to be configured by the master node (MN) side and this measurement needs the assistance from the FR2 gap, and in this scenario, the MN will send an FR2 frequency (an absolute radio frequency channel number (NR-ARFCN)) list to the SN through the X2 interface; and the measurement of the FR2 frequency needs to be configured by the SN side and this measurement needs the assistance from the FR2 gap, and in this scenario, the SN itself determines the FR2 gap configuration.

In the process which the SN side performs the FR2 gap configuration, according to the design of the current F1 interface, the DU performs a gap allocation, and the gNB-CU needs to notify the gNB-DU of relevant measurement frequency information, so that a reasonable gap configuration of the DU calculation is facilitated.

Figure 4:
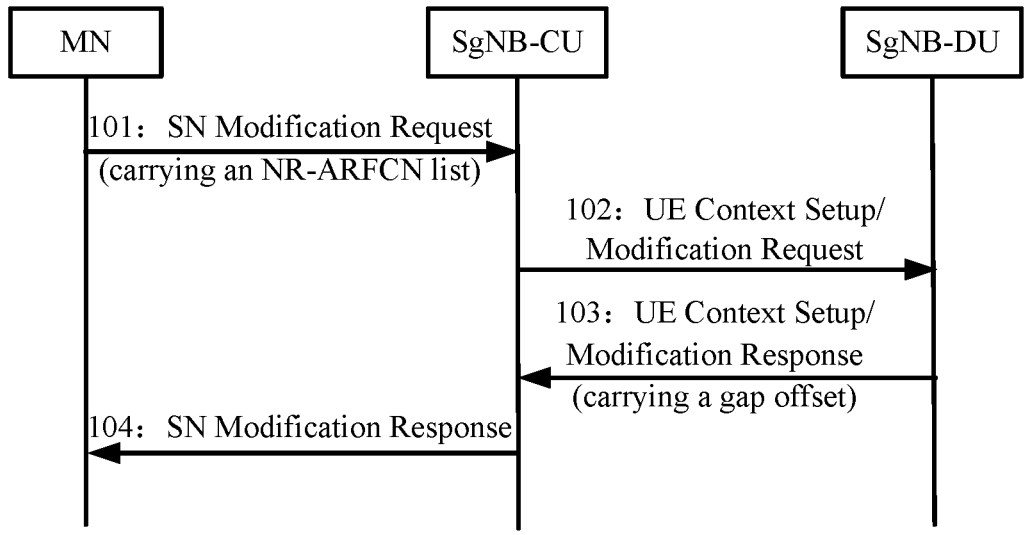
FIG. 4 is a flowchart of configuring FR2 frequency measurement on a master node side according to an embodiment of the present disclosure.

Therefore, there are two different processes described below for the two different triggering scenarios respectively. FIG. 4 is a flowchart of configuring the FR2 frequency measurement on the master node side according to an embodiment and this process includes steps described below.

In S101, the MN sends an SN addition request/SN modification request message to the SN, the message includes an FR2 measurement frequency list configured by the MN side.

In S102, after the SN receives the SN modification request message, the SgNB-CU notifies the SgNB-DU of the relevant FR2 measurement frequency information through a UE context setup/modification request message, so that the DU may perform the FR2 gap configuration. The above FR2 measurement frequency information includes at least one of: an FR2 measurement frequency list set, SMTC configuration of each measurement frequency, CSI-RS related time domain configuration information of each measurement frequency, an indication for indicating whether each measurement frequency initiates an SSB measurement, or an indication for indicating whether each measurement frequency initiates a CSI-RS measurement.

In S103, the SgNB-DU sends a calculation result of the FR2 gap configuration to the SgNB-CU through a UE context setup/modification response message.

In S104, the SgNB-CU sends the FR2 gap configuration to the UE through an NR RRC reconfiguration message of the SN side; or, the SgNB-CU sends an NR RRC message carrying the FR2 gap configuration to the UE through an LTE RRC reconfiguration message of the MN side.

In the S102, when the SN modification request message only carries the measurement frequency list set, the gNB-DU needs to acquire the SMTC configuration information and/or CSI-RS related time domain configuration information of each measurement frequency from a network management system.

Figure 5:
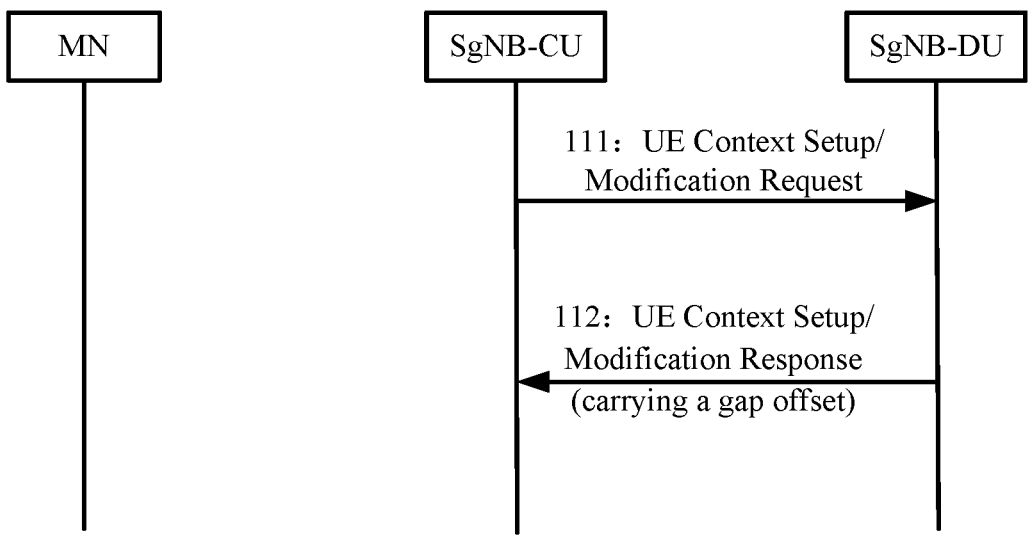
FIG. 5 is a flowchart of configuring FR2 frequency measurement on a secondary node side according to an embodiment of the present disclosure.

FIG. 5 is a flowchart of configuring FR2 frequency measurement on a secondary node side according to this embodiment and this process includes steps described below.

In S111, the gNB-CU notifies the SgNB-DU of relevant measurement frequency information through a UE context setup/modification request message, so that the DU may perform the gap configuration calculation. The above measurement frequency information includes: a measurement frequency list set, an SMTC configuration of each measurement frequency, CSI-RS related time domain configuration information of each measurement frequency, an indication for indicating whether each measurement frequency initiates an SSB measurement, and an indication for indicating whether each measurement frequency initiates a CSI-RS measurement.

In S112, the SgNB-DU sends a calculation result of the gap configuration to the SgNB-CU through a UE context setup/modification response message.

In the S111, when the SN modification request message only carries the measurement frequency list set, the gNB-DU needs to acquire the SMTC configuration information and/or CSI-RS related time domain configuration information of each measurement frequency from the network management system.

EXAMPLE TWO

In an intra-CU inter-DU scenario, when a measurement delivered by the base station side needs a gap assistance, a gNB-CU acquires a physical resource configuration on each gNB-DU, calculates a measurement gap pattern configuration based on the measurement target frequency and configuration information such as SMTC/CSI-RS of each frequency, and delivers the measurement gap pattern configuration to each DU through an F1 interface message.

Figure 6:
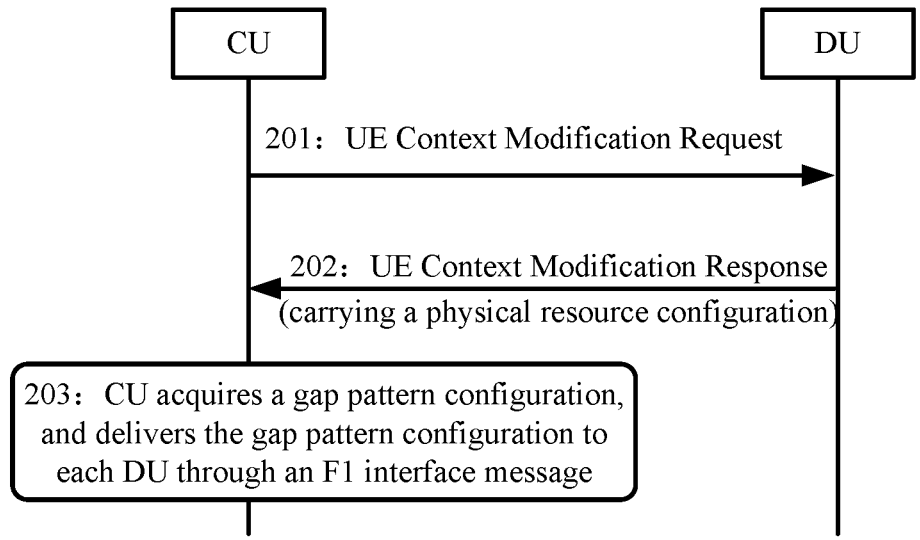
FIG. 6 is a flowchart of a CU acquiring a physical resource configuration on a DU through a message request according to an embodiment of the present disclosure.

FIG. 6 is a flowchart of a CU acquiring a physical resource configuration on a DU through a message request according to this embodiment, and this process includes steps described below.

In S201, the CU sends a physical resource configuration request to the DU through a UE context modification request message.

In S202, the DU reports the physical resource configuration to the CU through a UE context modification response.

In S203, the CU calculates a measurement gap pattern configuration according to acquired information about the physical resource configuration on each DU and in conjunction with a measurement target frequency and configuration information such as the SMTC and CSI-RS, of the frequency, and delivers the measurement gap pattern configuration to each DU through an F1 interface message.

Figure 7:
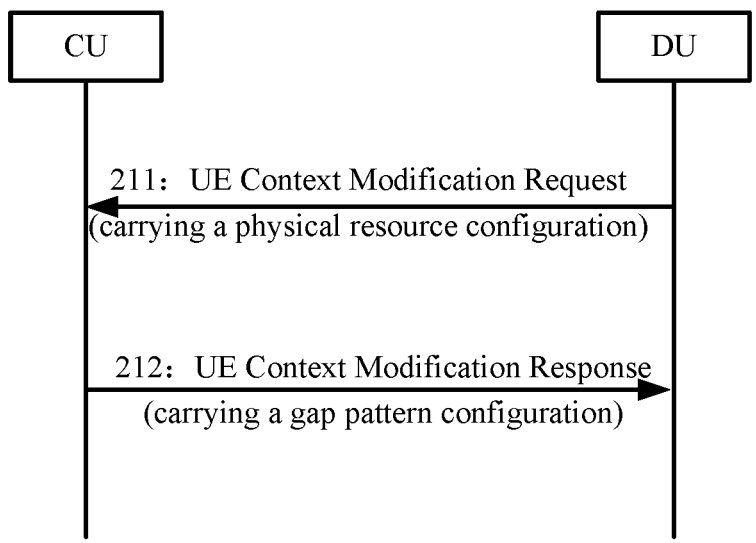
FIG. 7 is a flowchart of a DU actively reporting a physical resource configuration according to an embodiment of the present disclosure.

FIG. 7 is a flowchart of a DU actively reporting a physical resource configuration according to this embodiment, and this process includes steps described below.

In S211, the DU reports a physical resource configuration request to the CU through a UE context modification required message.

In S212, the CU calculates a measurement gap pattern configuration according to acquired information about the physical resource configuration on each DU in conjunction with the measurement target frequency and configuration information, such as the SMTC and/or CSI-RS, of the frequency, and delivers the measurement gap pattern configuration to each DU through a UE context modification confirm message.

Figure 8:
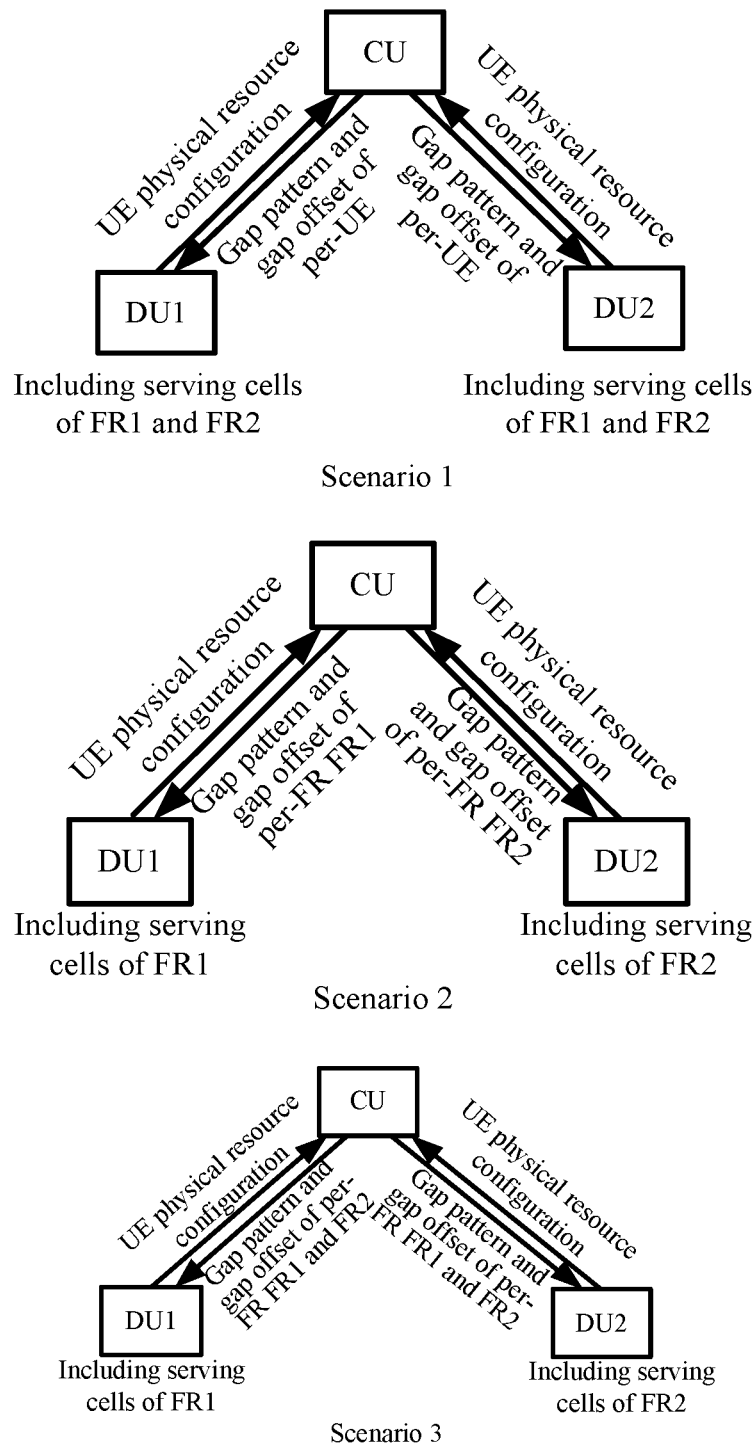
FIG. 8 is a schematic diagram of a CU sending a gap configuration according to different gap types according to an embodiment of the present disclosure.

For the above two cases, if the measurement gap type is the per-UE gap (scenario 1), the CU needs to send same one gap configuration to each DU; if the gap type is the per-FR gap (scenario 2), and there is only a serving cell of the FR1 on the DU1 and only a serving cell of the FR2 on the DU2, the CU sends the FR1 gap to the DU1 and the FR2 gap to the DU2. If the measurement gap type is the per-FR gap (scenario 3), the CU sends the FR1 gap and the FR2 gap simultaneously to each DU. FIG. 8 is a schematic diagram of a CU sending a gap configuration according to different gap types in this embodiment. For the per-UE gap and per-FR gap in this embodiment, the per-UE is simple, the network side only needs to configure one gap, and during this gap, all serving cells cannot schedule the UE, and the UE measures the LTE/NR low frequency/NR high frequency during this time period. For the per-FR, the network side needs to configure two gaps, one is called the LTE/FR1 gap. During this LTE/FR1 gap, neither the LTE serving cell nor the serving cell operating at the NR low frequency (FR1) may schedule the UE, and the UE measures the LTE frequency and NR low frequency during this time period. The other gap is called the FR2 gap, during this FR2 gap, a serving cell of the NR high frequency (FR2) cannot schedule the UE, and the UE measures the NR high frequency neighboring cell during this time period.

EXAMPLE THREE

Under a single DU, the UE has already configured the measurement gap configuration, and when a new DU is added and the single DU becomes the inter-DU DC, if the measurement gap capability is not changed, the CU may notify the target new DU of the measurement gap configuration which has been in the CU.

If the target new DU cannot adapt to the gap pattern configuration, for example, if the target DU has no other optional physical resource configuration in this measurement gap pattern configuration, the new DU may feed back an indication to the CU, or provide a recommended measurement gap configuration to the CU. The CU or the original DU re-performs a measurement gap allocation.

Figure 9:
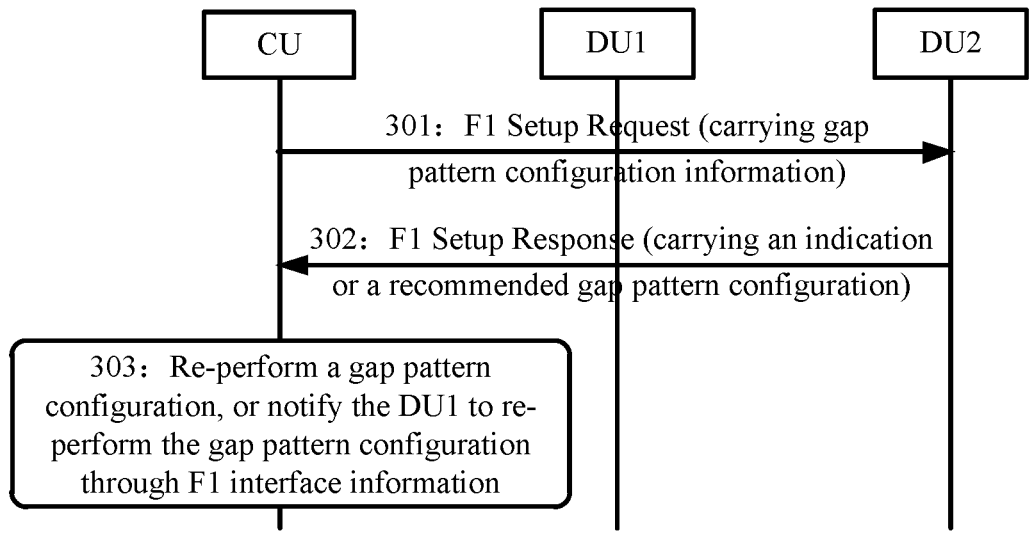
FIG. 9 is a flowchart of a gap pattern configuration method under a multi-connection architecture in NR according to an embodiment of the present disclosure.

FIG. 9 is a flowchart of a gap pattern configuration method under a multi-connection architecture in NR in this embodiment, and this process includes steps described below.

In S301, when a new DU is added, the CU may notify the target DU (DU2) of the gap pattern configuration information, which has been in the CU, through an F1 setup request message.

In S302, if the DU2 cannot use this configuration, the DU2 may send a feedback indication or a recommended gap pattern configuration to the CU through an F1 setup response message.

In S303, after the feedback from the DU2 is received, the CU will re-perform the gap pattern configuration, or notify the DU1 to re-perform the gap pattern configuration through F1 interface information.

EXAMPLE FOUR

In the NE-DC scenario, when the secondary node (LTE) side delivers a measurement, or the secondary node side modifies a secondary cell configuration, an RRC reconfiguration message of the LTE is carried in an NR RRC message and then delivered to the UE, an LTE reconfiguration complete message responded by the UE carried in an NR RRC reconfiguration complete message is sent to the master node, where an information element of the NR RRC message carries the above measurement gap requirement indication. After receiving this indication, the master node further generates a measurement gap configuration, delivers the measurement gap configuration to the UE, and simultaneously sends the measurement gap configuration to the SN through the Xn interface.

Figure 10:
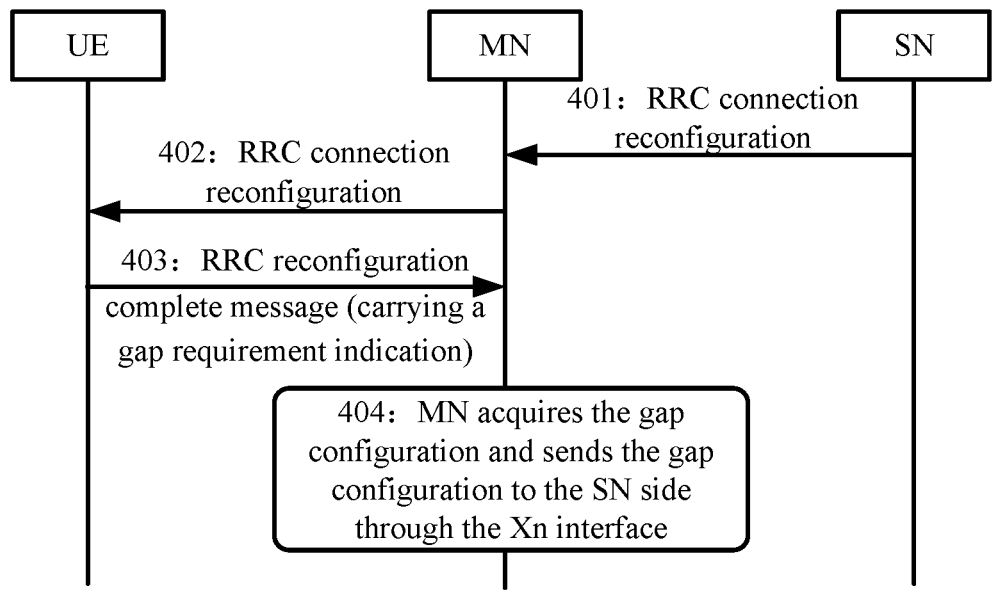
FIG. 10 is a flowchart of a method for a UE to notify a network side when the gap requirement changes according to an embodiment of the present disclosure.

FIG. 10 is a flowchart of a method for a UE to notify a network side when the gap requirement changes in this embodiment, and this process includes steps described below.

In S401 to S402, when the secondary node side delivers a measurement or modifies a secondary node configuration, an RRC connection reconfiguration message of the LTE is carried in an NR RRC message and then sent to the UE.

In S403, an LTE reconfiguration complete message responded by the UE is carried in an NR RRC reconfiguration complete message and sent to the master node, where the NR RRC reconfiguration complete message carries a gap requirement indication.

In S404, after receiving the instruction, the master node further generates a gap configuration, delivers the gap configuration to the UE, and simultaneously sends the gap configuration to the secondary node side through the Xn interface.

EXAMPLE FIVE

Figure 11:
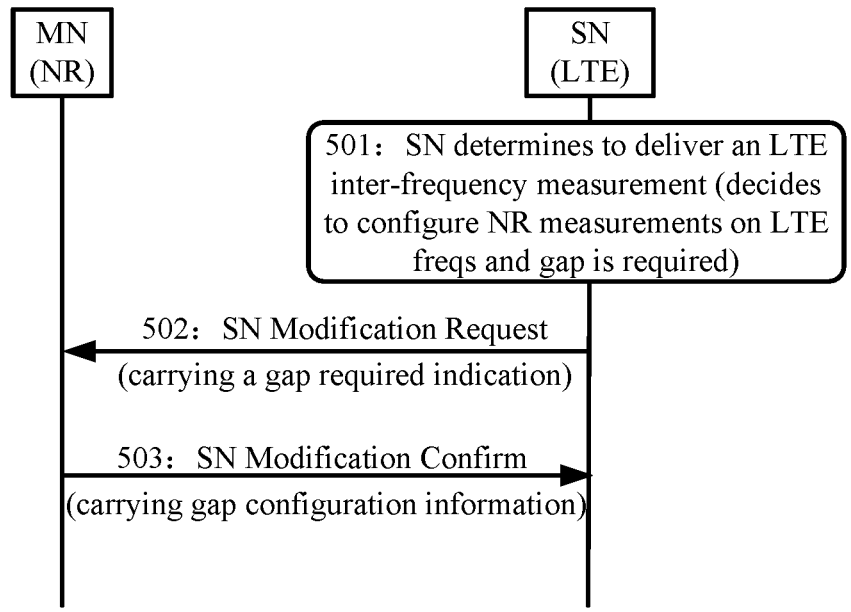
FIG. 11 is a flowchart of a secondary node requesting to acquire a gap configuration according to an embodiment of the present disclosure.

Scenario 1: in the NE-DC scenario, FIG. 11 is a flowchart of a secondary node requesting to acquire a gap configuration in this embodiment. This process includes steps described below.

In S501, the secondary node side determines to deliver an LTE inter-frequency measurement.

In S502, the master node requests a gap pattern configuration through an SN modification required message.

In S503, the master node performs the gap configuration, and sends the gap configuration information to the secondary node side through an SN modification confirm message.

Figure 12:
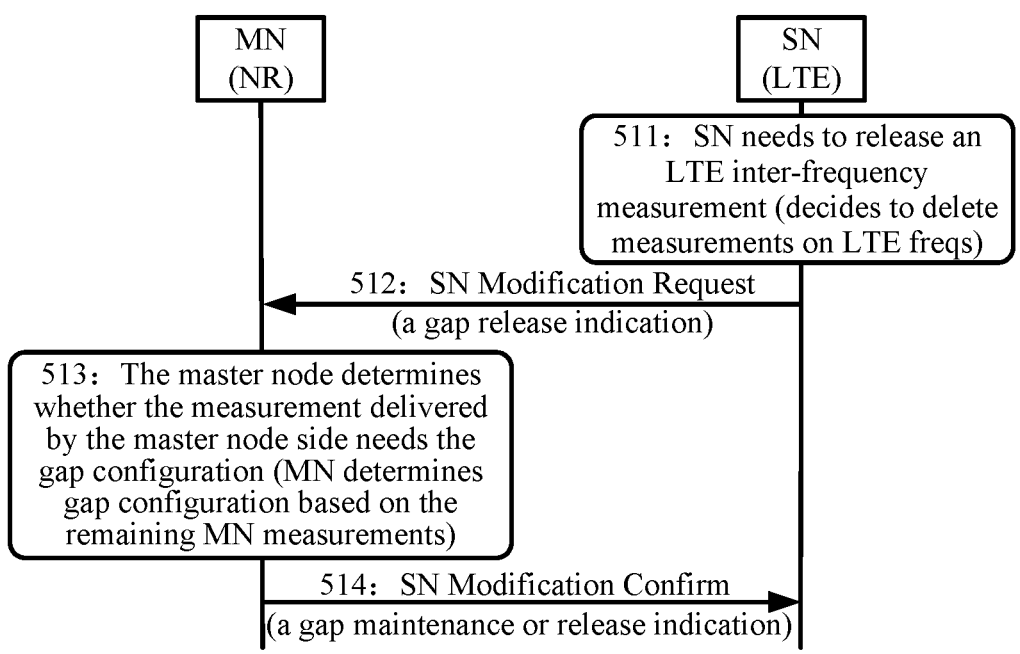
FIG. 12 is a flowchart of a secondary node requesting to delete a gap configuration according to an embodiment of the present disclosure.

Scenario 2: in the NE-DC scenario, FIG. 12 is a flowchart of a secondary node requesting to delete a gap configuration in this embodiment. This process includes steps described below.

In S511, the secondary node side needs to release an LTE inter-frequency measurement, and does not need the gap configuration.

In S512, the secondary node requests a gap configuration through an SN modification required message.

In S513, the master node determines whether the measurement on the master node side needs the gap configuration, and if not, deletes the gap configuration through an air interface reconfiguration command.

In S514, the master node notifies the secondary node side that the gap configuration is released through an SN modification confirm message.

EXAMPLE SIX

Under the architecture of NE-DC, for the per-UE gap or the FR1 gap of the per-FR configured by the master node side, whether a current UE has a measurement object of the LTE inter-frequency may affect the optional set of gap patterns on the MN side. In the scenario, the master node side and the secondary node side may both deliver the LTE inter-frequency measurement. Therefore, it is required for the secondary node to notify the master node, in an indication manner, whether the secondary node itself has delivered the LTE inter-frequency measurement.

Figure 13:
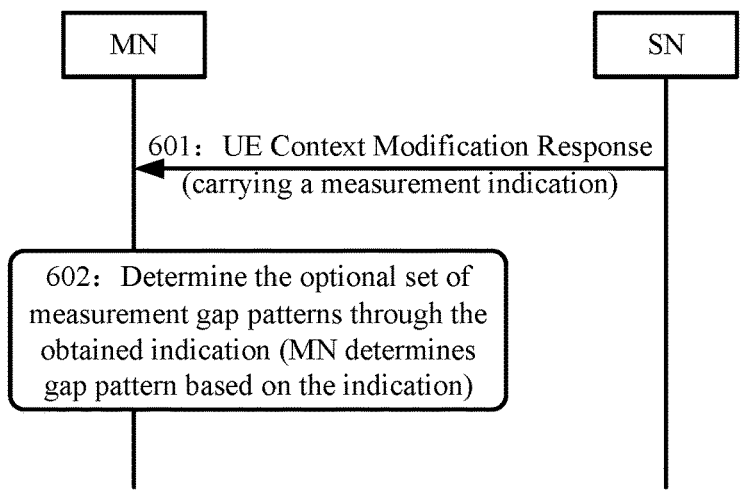
FIG. 13 is a flowchart of a master node determining an optional set of gap patterns according to an indication according to an embodiment of the present disclosure.

FIG. 13 is a flowchart of a master node determining an optional set of gap patterns according to an indication in this embodiment, and this process includes steps described below.

In S601, the secondary node sends an SN modification required message to the master node, and notifies the master node whether the secondary node side delivers or detects the LTE inter-frequency measurement. Whether the SN side delivers or detects the LTE inter-frequency measurement may be indicated through an explicit information element in SN modification required signaling, or through an explicit information element in an RRC inter-node message carried in the SN modification required signaling.

In S602, the master node determines the optional set of measurement gap patterns through the obtained indication.

EXAMPLE SEVEN

In the EN-DC or NN-DC scenario, the master node and the secondary node performs an interaction about a measurement gap configuration capability through cell common signaling on the X2/Xn interface.

Figure 14:
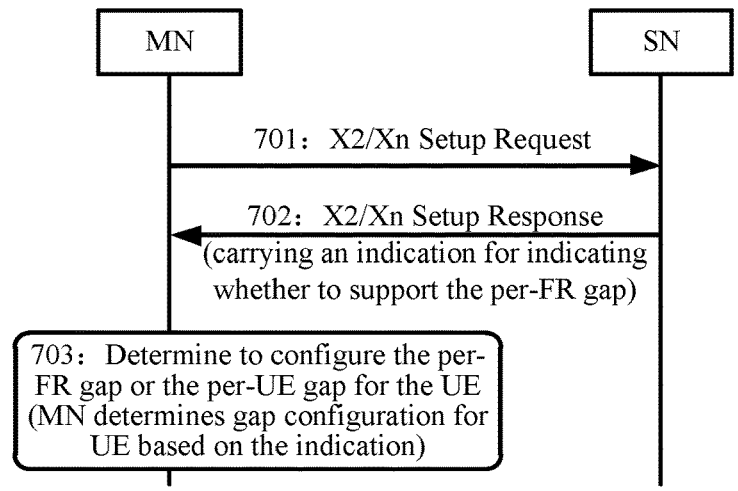
FIG. 14 is a flowchart of an interaction between a master node and a secondary node about a gap configuration capability through cell common signaling according to an embodiment of the present disclosure.

FIG. 14 is a flowchart of an interaction between a master node and a secondary node about a gap configuration capability through cell common signaling in this embodiment, and this process includes steps described below.

In S701, the master node acquires a capability support indication of the secondary node through an X2/Xn setup request message.

In S702, the secondary node determines whether the secondary node supports the pre-FR gap (including FR2 gap configuration and per-FR scheduling support) through an X2/Xn setup response message.

In S703, after receiving the capability support indication, the master node may determine to configure the per-FR gap or the per-UE gap for the UE according to the condition.

In the EN-DC or NN-DC scenario, the master node and the secondary node performs an interaction about the gap configuration capability through UE-dedicated signaling on the X2/Xn interface.

Figure 15:
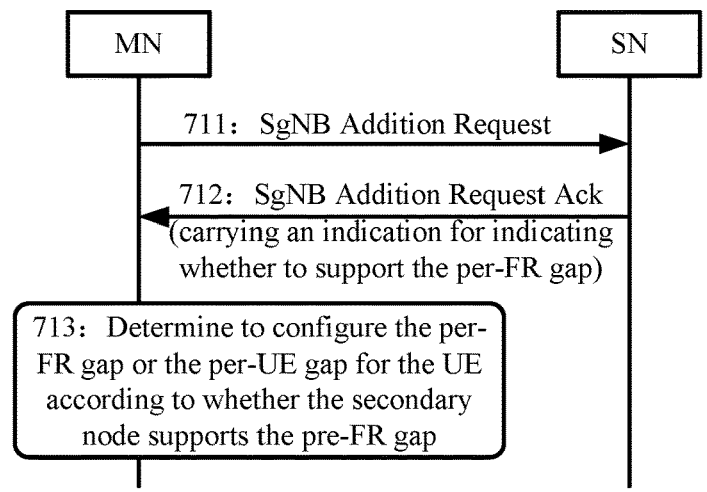
FIG. 15 is a flowchart of an interaction between a master node and a secondary node about a gap configuration capability through UE-dedicated signaling according to an embodiment of the present disclosure.

FIG. 15 is a flowchart of an interaction between a master node and a secondary node about a gap configuration capability through UE-dedicated signaling in this embodiment, and this process includes steps described below.

In S711, the master node acquires a capability support indication of the secondary node through an SgNB addition request message.

In S702, the secondary node notifies the master node whether the secondary node supports the pre-FR gap (including FR2 gap configuration and per-FR scheduling support) through an SgNB addition request ack message.

In S713, after receiving the capability support indication, the master node may determine to configure the per-FR gap or the per-UE gap for the UE according to whether the secondary node supports the pre-FR gap.

EMBODIMENT TEN

An embodiment of the present disclosure further provides a storage medium. The storage medium stores a computer program. When the computer program is executed, the steps in any one of the preceding method embodiments are performed.

In this embodiment, the above storage medium may be configured to store a computer program for performing steps described below.

In S1, a first network element determines frequency information of a measurement target.

In S2, the first network element notifies a second network element of the frequency information through F1 interface signaling.

In an embodiment, in this embodiment, the above-mentioned storage medium may include, but is not limited to, a U disk, a read-only memory (ROM), a random access memory (RAM), a mobile hard disk, a magnetic disk, an optical disk or another medium capable of storing computer programs.

An embodiment of the present disclosure further provides an electronic device. The electronic device includes a memory and a processor. The memory stores a computer program. The processor is configured to execute the computer program to perform the steps in any one of the preceding method embodiments.

In an embodiment, the electronic device described above may further include a transmission apparatus and an input/output apparatus, where both of the transmission apparatus and the input/output apparatus are connected to the processor described above.

In this embodiment, the above-mentioned processor may be configured to perform steps described below through a computer program.

In S1, a first network element determines frequency information of a measurement target.

In S2, the first network element notifies a second network element of the frequency information through F1 interface signaling.

In an embodiment, reference of examples in this embodiment may be made to the examples described in the preceding embodiments and alternative implementations, and the examples will not be repeated in this embodiment.

Apparently, it is to be understood by those skilled in the art that the modules or steps of the present disclosure may be implemented by at least one generic computing device and may be concentrated on a single computing device or distributed in a network formed by multiple computing devices. In an embodiment, these modules or steps may be implemented by program codes executable by the at least one computing device. Thus, these modules or steps may be stored in a storage medium and executed by the at least one computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this way, the present disclosure is not limited to any specific combination of hardware and software.

The above are only alternative embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure.

We claim:

1. A measurement gap configuration method, comprising:
receiving, by a centralized unit of a secondary node (SN) in a dual connectivity network, from a master node (MN) in the dual connectivity network, a list of measurement frequencies;
sending, by the centralized unit to a distributed unit of the SN in the dual connectivity network, frequency information through a first message over an interface, wherein the frequency information is for the distributed unit to perform a gap configuration to generate a measurement gap, wherein the frequency information comprises: (i) the list of measurement frequencies provided by the MN to the centralized unit of the SN and (ii) synchronized signal block measurement timing configuration (SMTC) information of each measurement frequency in the list of measurement frequencies provided by the MN to the centralized unit of the SN, wherein the centralized unit and the distributed unit are both part of the SN in the dual connectivity network; and
receiving, by the centralized unit of the SN from the distributed unit of the SN, a second message over the interface, in response to the frequency information, the second message including the gap configuration.

2. The method of claim 1, wherein the first message comprises at least one of: a user equipment (UE) context setup request, or a UE context modification request.

3. A measurement gap configuration method, comprising:
transmitting, by a distributed unit of a secondary node (SN) in a dual connectivity network, to a centralized unit of the SN in the dual connectivity network, a second message over an interface, the second message including a gap configuration to generate a measurement gap, wherein the centralized unit and the distributed unit are both part of the SN in the dual connectivity network,
wherein the gap configuration is performed based on frequency information that is received by the distributed unit of the SN from the centralized unit of the SN in a first message over the interface, wherein the frequency information comprises: (i) a list of measurement frequencies provided by a master node (MN) to the centralized unit of the SN and cii) synchronization signal block measurement timing configuration (SMTC) information of each measurement frequency in the list of measurement frequencies provided by the MN to the centralized unit of the SN, wherein the list of measurement frequencies is provided by the MN in the dual connectivity network to the centralized unit of the SN in the dual connectivity network.

4. The method of claim 3, wherein the first message comprises at least one of: a user equipment (UE) context setup request, or a UE context modification request.

5. A device, comprising a memory and a processor, wherein the memory is configured to store a computer program, and the processor is configured to execute the computer program to:
receive, from a master node (MN) in a dual connectivity network, a list of measurement frequencies;
send, to a distributed unit of a secondary node (SN) in the dual connectivity network, frequency information through a first message over an interface, wherein the frequency information is for the distributed unit to perform a gap configuration to generate a measurement gap, wherein the frequency information comprises: (i) the list of measurement frequencies provided by the MN to the device of the SN and (ii) synchronization signal block measurement timing configuration (SMTC) information of each measurement frequency in the list of measurement frequencies provided by the MN to the device of the SN, wherein the device and the distributed unit are both part of the SN in the dual connectivity network; and
receive, from the distributed unit of the SN, a second message over the interface, in response to the frequency information, the second message including the gap configuration.

6. The device of claim 5, wherein the first message comprises at least one of: a user equipment (UE) context setup request, or a UE context modification request.

7. The device of claim 5, wherein the device includes a centralized unit.

8. A device, comprising a memory and a processor, wherein the memory is configured to store a computer program, and the processor is configured to execute the computer program to:
- transmit, to a centralized unit of a secondary node (SN) in a dual connectivity network, a second message over an interface, the second message including a gap configuration to generate a measurement gap, wherein the centralized unit and the device are both part of the SN in the dual connectivity network,
- wherein the gap configuration is performed based on frequency information that is received by the device of the SN from the centralized unit of the SN in a first message over the interface, wherein the frequency information comprises: (i) a list of measurement frequencies provided by a master node (MN) to the centralized unit of the SN and (ii) synchronization signal block measurement timing configuration (SMTC) information of each measurement frequency in the list of measurement frequencies provided by the MN to the centralized unit of the SN, wherein the list of measurement frequencies is provided by the MN in the dual connectivity network to the centralized unit of the SN in the dual connectivity network.

9. The device of claim 8, wherein the first message comprises at least one of: a user equipment (UE) context setup request, or a UE context modification request.

10. The device of claim 8, wherein the device includes a distributed unit of the first node.

* * * * *